United States Patent [19]
Massey

[11] Patent Number: 5,475,888
[45] Date of Patent: Dec. 19, 1995

[54] LIP LIFTING MECHANISM FOR A DOCK LEVELER

[75] Inventor: Douglas H. Massey, New Berlin, Wis.

[73] Assignee: Kelley Company, Inc., Milwaukee, Wis.

[21] Appl. No.: 381,085

[22] Filed: Jan. 31, 1995

[51] Int. Cl.⁶ ........................................................ E01D 1/00
[52] U.S. Cl. ................................ 14/69.5; 14/71.1; 14/71.3
[58] Field of Search ...................................... 14/69.5, 71.1, 14/71.3, 71.5, 71.7

[56] References Cited

U.S. PATENT DOCUMENTS

| | | | |
|---|---|---|---|
| 2,495,092 | 1/1950 | Cox et al. . | |
| 2,610,824 | 9/1952 | Grier . | |
| 2,804,118 | 8/1957 | Bayerkohler . | |
| 3,012,804 | 12/1961 | Jeavons . | |
| 3,117,332 | 1/1964 | Kelley et al. . | |
| 3,211,425 | 10/1965 | Greulich et al. . | |
| 3,521,861 | 7/1970 | Freudenthal et al. . | |
| 3,528,118 | 9/1970 | Smith . | |
| 3,659,899 | 5/1972 | Phillips et al. | 298/22 R |
| 3,711,157 | 1/1973 | Smock | 298/8 R |
| 3,997,932 | 12/1976 | Artzberger | 14/71.3 |
| 4,012,804 | 3/1977 | Catlett | 14/71.3 |
| 4,081,874 | 4/1978 | Artzberger | 14/71.7 |
| 4,293,969 | 10/1981 | Frommelt | 14/71.1 |
| 4,343,058 | 8/1982 | Loblick | 14/71.7 |
| 4,488,325 | 12/1984 | Bennett et al. | 14/71.3 |
| 4,572,579 | 2/1986 | Saito | 298/1 A |
| 4,688,760 | 8/1987 | Garman et al. | 254/93 |
| 4,786,032 | 11/1988 | Garman et al. | 254/93 HP |
| 4,937,906 | 7/1990 | Alexander | 14/71.1 |
| 4,955,923 | 9/1990 | Hageman | 14/71.7 |
| 5,042,103 | 8/1991 | Megens | 14/71.7 |
| 5,088,143 | 2/1992 | Alexander | 14/69.5 |

FOREIGN PATENT DOCUMENTS

| | | |
|---|---|---|
| 0386850 | 9/1990 | European Pat. Off. . |
| 835142 | 5/1960 | United Kingdom . |
| WO-A-9313267 | 7/1993 | WIPO . |

Primary Examiner—Ramon S. Britts
Assistant Examiner—Pamela A. O'Connor
Attorney, Agent, or Firm—Michael, Best & Friedrich

[57] ABSTRACT

A lip lifting mechanism for the pivotable lip of a dock leveler moves the lip to an operative extended position as the ramp of the dock leveler is moved from a raised position toward a lowered position. The lip lifting mechanism includes a push bar, a lifting rod, a lug engageable with the lip through the lifting rod, and a link arrangement to which the lifting rod is pivotably mounted, with the push bar being engageable with the link arrangement upon downward movement of the ramp. The push bar moves the link arrangement and the lifting rod into an over-center toggle position to extend the lip. Engagement of the lip with the bed of a truck results in the link arrangement and the lifting rod being moved to an under-center release position, so as to enable the lip to fall to a pendant position when the truck moves away from the dock. The invention contemplates a unique construction of the engagement structure between the push bar and the link arrangement for increasing the force applied to the lifting rod by the push bar, and a trip structure for ensuring that the lip is always returned to its pendant position when the dock leveler is in a lowered, storage position.

17 Claims, 5 Drawing Sheets

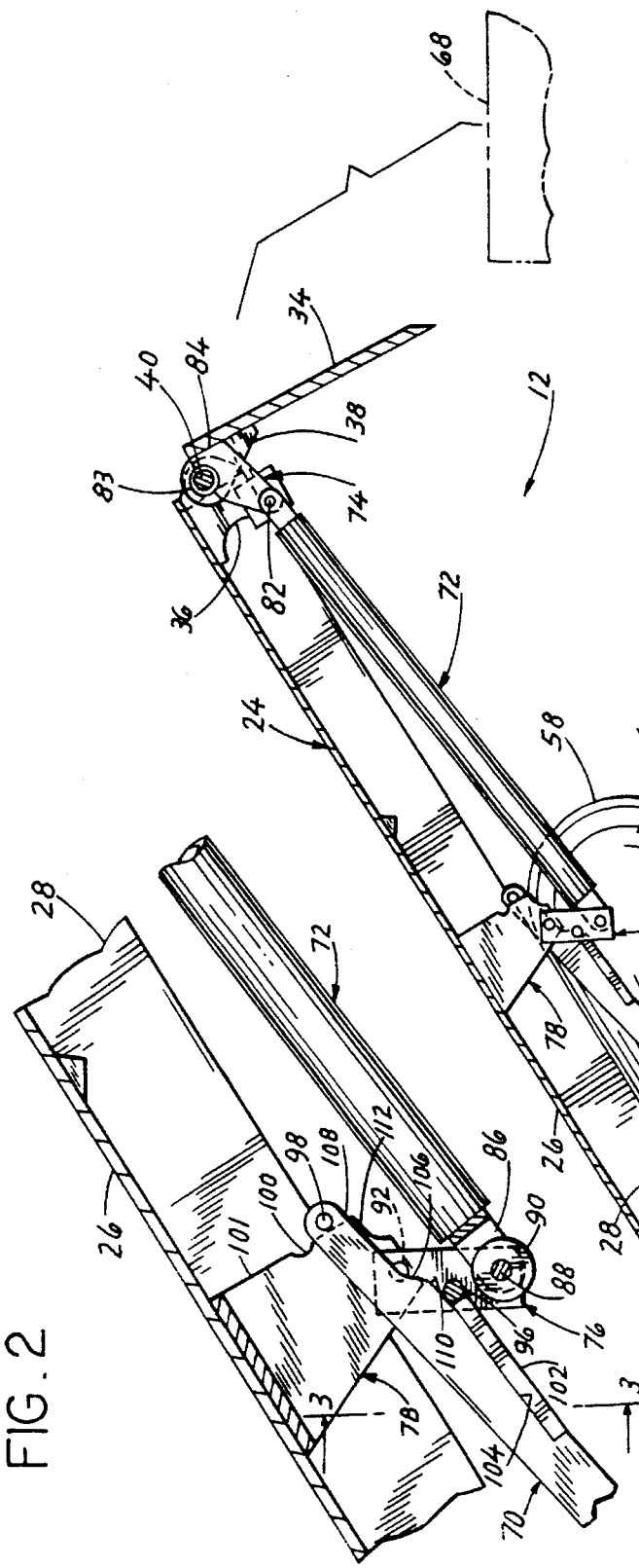
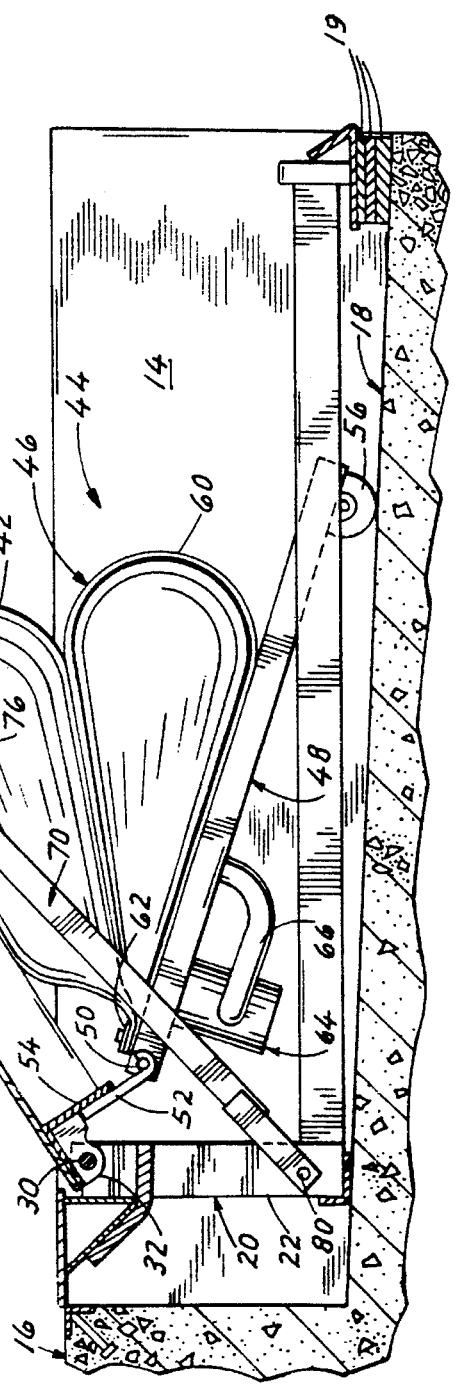

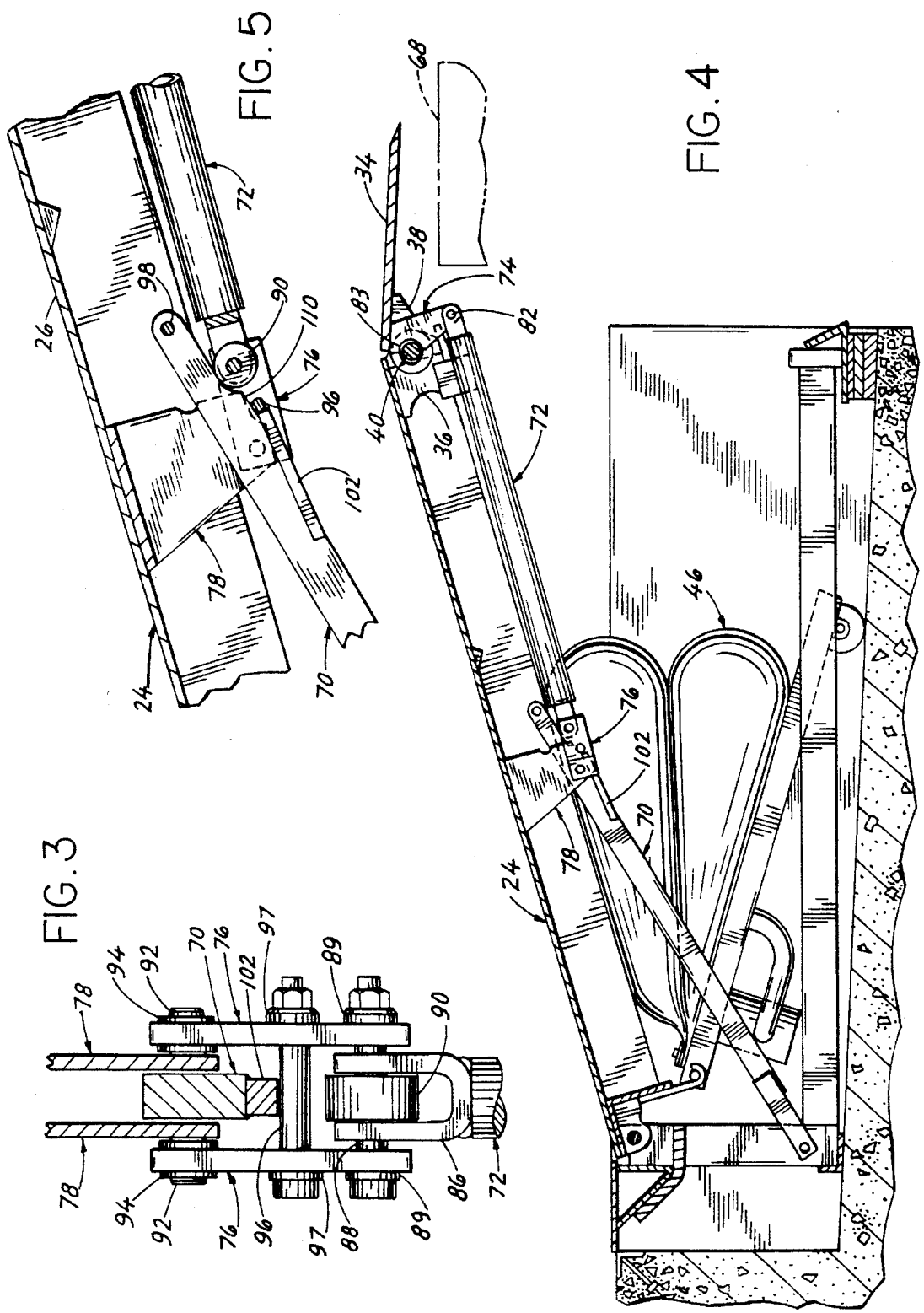

LIP LIFTING MECHANISM FOR A DOCK LEVELER

BACKGROUND AND SUMMARY OF THE INVENTION

This invention relates to a dock leveler, and more particularly to a dock leveler having a ramp movable from a lowered position to a raised position and having a lip pivotably mounted to the ramp for movement between an inoperative, pendant position to an operative raised position as the ramp moves from its raised position to its lowered position.

U.S. Pat. No. 3,997,932, issued Dec. 21, 1976 and assigned to the same assignee as the present application, discloses a lip lifting mechanism for a dock leveler for moving the lip of the dock leveler from an inoperative pendant position to an operative raised position as the ramp is lowered from its raised position toward its lowered position. This extension of the lip during downward movement of the ramp enables the lip to engage the bed of a truck or the like parked adjacent the dock, to facilitate loading or unloading of the truck. Generally, the lip lifting mechanism disclosed in U.S. Pat. No. 3,997,932 includes a push bar pivotably mounted at its rear end to the frame of the dock leveler within the pit of the dock within which the dock leveler is mounted, and a lifting rod pivotably interconnected with the lip via pivoting lug structure. The forward end of the lifting rod is pivotably mounted to the lug structure. The rearward end of the lifting rod is pivotably mounted toward one end of a pair of links, which are pivotably mounted at their opposite end to a hanger bracket mounted to and extending downwardly from the deck plate of the ramp. A latch pin extends between the links, and is engageable by a notch formed in the push bar as the ramp is lowered. The push bar, links, latch pin and lifting rod define a toggle mechanism in which the lifting rod and links are moved by engagement of the push bar notch with the latch pin to an over-center toggle position upon lowering of the ramp, to raise and latch the lip in its operative position as the ramp is lowered by engagement of the lug with the lip. Once the lip engages the truck bed, the weight of the lip exerted on the lifting rod through the lug is relieved, to break the toggle by allowing the link and lifting rod to pivot to an under-center, inoperative position. When the lifting rod and link are in the over-center toggle position, the second end of the push bar is moved upwardly so as to disengage the push bar notch from the latch pin, thus enabling the link and lifting rod to fall to the under-center position when the lip rests on the truck bed. When the ramp is raised, the lip is free to fall to its inoperative pendant position, in preparation for a subsequent cycle for again moving the lip to its operative extended position as the ramp is raised and lowered.

It is an object of the present invention to provide a lip lifting mechanism having generally the same construction and operation as summarized above, yet which provides improved and advantageous operation. A still further object of the invention is to ensure that the lip is at all times returned to its inoperative position when the ramp is in its fully lowered position, even when the lip does not engage the truck bed as the ramp is moved toward its lowered position. Yet another object of the invention is to provide a lip lifting mechanism which also functions as a stop to limit upward movement of the ramp to its raised position.

In accordance with one aspect of the invention, an improved lip lifting mechanism for a dock leveler includes a push bar defining first and second ends, with the first end being pivotably mounted to a stationary structure, such as the dock leveler frame located within the pit toward its rearward end. An axial lifting rod defines first and second ends, with a first end of the rod being pivotably mounted to a pivotable lug with which the lip is engageable. One or more links, preferably a pair of links, are pivotably mounted to the lifting rod toward its second end for pivoting movement about a first pivot axis. The links are also pivotably mounted to the ramp, such as to a hanger bracket mounted to the under-side of the deck plate of the ramp, for pivoting movement about a second pivot axis. The second end of the push bar is located adjacent the links and movable relative to the links upon movement of the links caused by raising and lowering of the ramp. Engagement structure is interposed between the links and the push bar for engaging the push bar with the links after the ramp has been raised and during downward movement of the ramp toward its lowered position. The engagement structure functions to move the links and the lifting rod into an over-center toggle position as the ramp moves toward its lowered position, to move the lip to its extended latched and operative position. The engagement structure between the links and the push bar is engageable at a location spaced toward the push bar from a transverse axis interconnecting the first and second pivot axes of the links, to increase the force exerted by the push bar on the lifting rod over an arrangement in which the engagement structure is in line with the transverse axis interconnecting the first and second pivot axes of the links. The hanger bracket defines a forward edge and a downwardly facing lower edge. The engagement structure includes a latch pin, such as in the form of a bolt extending between the pair of links, with the latch pin being engageable with the lower edge of the bracket to limit pivoting movement of the links and to provide a stop to fix the links and the lifting rod in the over-center toggle position in which the lip is moved to its extended latched operative position prior to engagement with the truck bed. The lower edge of the bracket defines a notch toward its forward end, within which the latch pin is received when the latch pin and the lifting rod are in the over-center toggle position. The latch pin is mounted to the links such that the latch pin is located below the transverse axis interconnecting the first and second pivot axes of the link, when the link and the lifting rod are in the over-center position. The location of the latch pin, in combination with an angled engagement surface provided on the push bar to engage the latch pin, exerts a significantly increased force on the latch pin by the push bar during descent of the ramp. The forward edge of the bracket further includes a notch, which receives a stop pin mounted toward the second end of the push bar, so as to limit upward movement of the ramp to its raised position.

In accordance with another aspect of the invention, a release arrangement is provided for moving the link and lifting rod from the over-center toggle position when the ramp reaches a predetermined point in its descent from its raised position to its lowered position. The release arrangement includes a trip member mounted to the ramp and movable therewith, which is engageable with the second end of the push bar as the ramp approaches its fully lowered position. This causes engagement of the push bar with a roller mounted coaxially with the first pivot axis about which the links are pivotably mounted to the lifting rod, which breaks the toggle formed by the links and lifting rod when in the over-center toggle position. The trip member is preferably in the form of a downwardly extending angle section mounted to the under-side of the ramp deck plate.

This construction provides positive movement of the links and lifting rod to an under-center position in which the toggle is broken, so as to ensure that the lip falls to its pendant position at the completion of each cycle, even when the lip does not engage a truck bed during downward movement of the ramp from its raised position toward its lowered position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view, partially in section, of a dock leveler incorporating the lip lifting mechanism of the invention and showing the ramp in its raised position;

FIG. 2 is an enlarged partial section view showing one of the links and portions of the push bar and lifting rod of the lip lifting mechanism of FIG. 1 in an under-center position;

FIG. 3 is a partial sectional view taken along line 3—3 of FIG. 2;

FIG. 4 is a view similar to FIG. 1, showing the ramp moved downwardly from its raised position toward the bed of a truck, with the lip moved from its pendant position toward its extended operative position;

FIG. 5 is an enlarged partial section view similar to FIG. 2, showing one of the links and portions of the push bar and lifting rod in a near over-center position;

DETAILED DESCRIPTION OF THE PREFERRED EMBODIMENT

Figure 6:
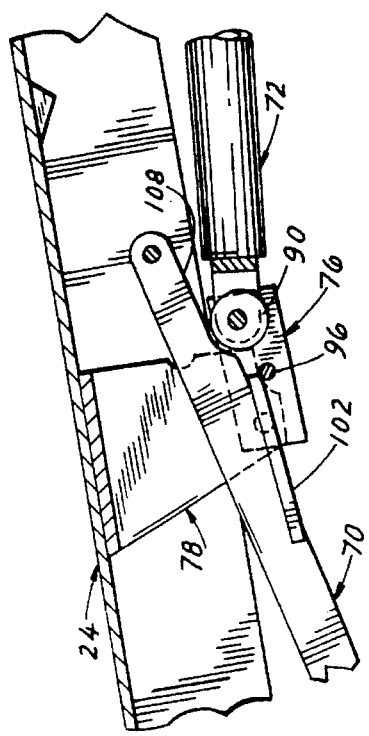
FIG. 6 is a view similar to FIG. 5, showing the lifting rod and links in an over-center position.

Referring to FIG. 1, a dock leveler shown generally at 12 is mounted within a pit 14 formed in a loading dock 16. Pit 14 defines a pit floor 18, which is preferably constructed so as to slope downwardly in a rear-to-front direction toward the front end of pit 14. A series of shims 19 support the front end of dock leveler 12. Alternatively, dock leveler 12 may be installed in a pit having a non-sloped floor 18, thus eliminating the need for shims 19.

Dock leveler 12 includes a frame 20 having a series of rear vertical frame members 22 spaced forwardly from the rear wall of pit 14. A ramp 24, which generally includes a deck plate 26 and a series of longitudinally extending beams 28, is pivotably mounted at its rear end via a series of pivot pins 30 which pivotably mount brackets 32 at the rear end of ramp 24 to the upper ends of frame members 22.

Figure 7:
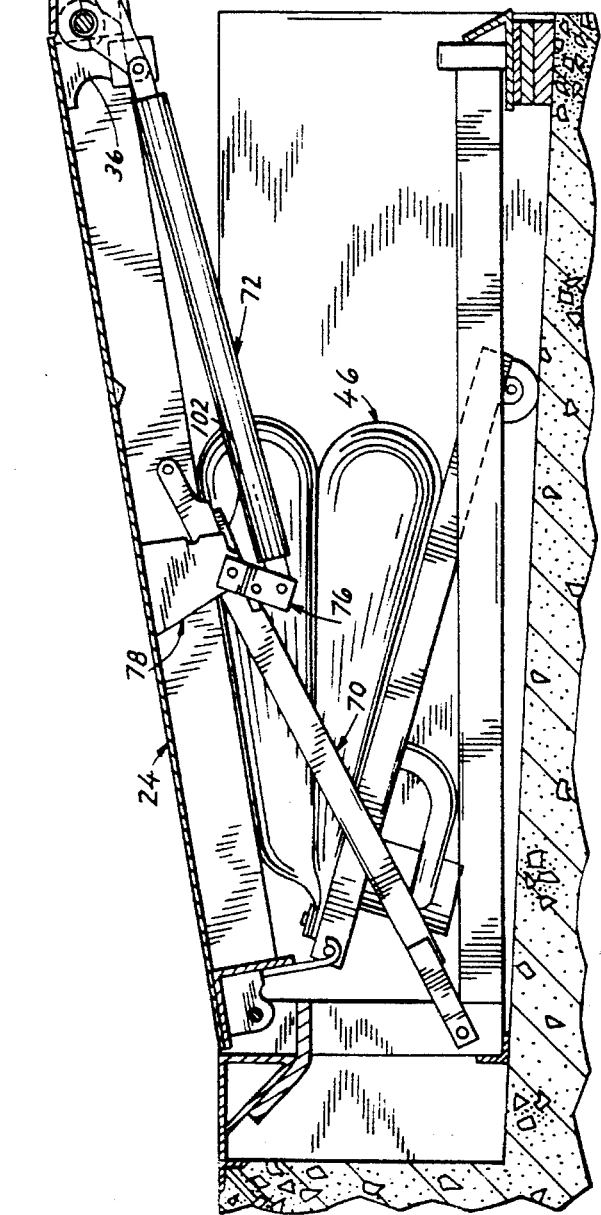
FIG. 7 is a view similar to FIGS. 1 and 4, showing engagement of the lip with a truck bed and showing the links and lifting rod returned to their under-center position.
Figure 8:
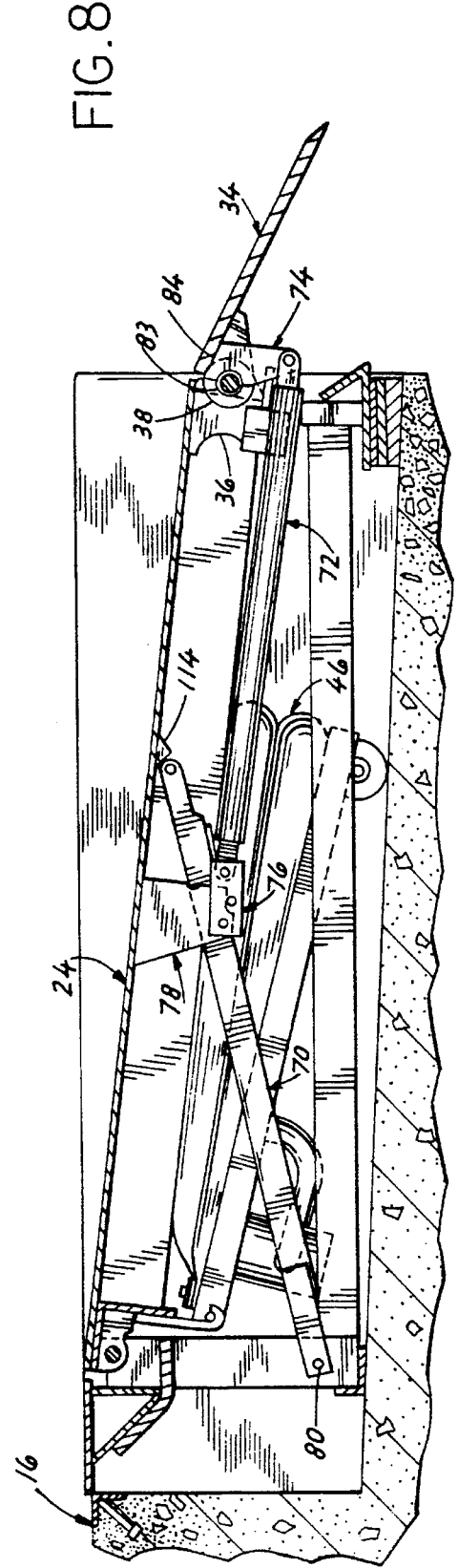
FIG. 8 is a view similar to FIGS. 1, 4 and 7, showing the ramp approaching its full-down position in a situation in which the lip did not engage a truck bed as the ramp moved from its raised position toward its lowered position.

An extension lip 34 is pivotably mounted at the forward end of ramp 24. A series of lugs 36 are mounted to the forward ends of beams 28, and a series of lip mounting brackets 38 are pivotably mounted to lugs 36 via a hinge pin or shaft 40 being received within hinge tube 36 for providing pivoting movement of lip 34 from a downwardly hanging pendant position, as shown in FIG. 1, to an extended operative position in which lip 34 forms an extension to deck plate 26 of ramp 24, as shown in FIGS. 4, 7 and 8.

In accordance with the invention, lip 34 is moved from its pendant position to its extended operative position by operation of a lip lifting mechanism, shown generally at 42.

A lifting assembly 44 is disposed between the under-side of ramp 24 and pit floor 18, for lifting ramp 24 to its raised position from its lowered position. Lifting assembly 44 includes an airbag assembly 46 which bears between a support assembly 48 and a pressure plate (not shown) mounted across the under-sides of beams 28. Support assembly 48 is in the form of a pan-type structure preferably formed of one or more sections, which is pivotably mounted at its rearward end via a cross-shaft 50 being received within upwardly facing recesses defined by a series of bracket members or hooks 52 mounted to a rear angle member 54 located at the rearward end of ramp 24. With this construction, support assembly 48 can be selectively removed from engagement with ramp 24 by disengaging shaft 50 from hooks 52. A series of wheels 56 are mounted to the forward end of support assembly 48, and are engageable with pit floor 18 for providing movement of support assembly 48 during raising and lowering of ramp 24.

Airbag assembly 46 includes an upper bag 58 and a lower bag 60, which are tethered at their rear ends via a clamp bar 62 to support assembly 48, as disclosed in copending application Ser. No. 08/381,080 filed Jan. 31, 1995 and entitled "Retaining Arrangement For An Inflatable Member In A Dock Leveler." A fan assembly 64 is mounted to support assembly 48 for selectively introducing pressurized air into upper and lower bags 58, 60, respectively, upon operation of fan 64 through appropriate piping 66.

The construction and operation of lifting assembly 44 is set forth in detail in copending applications Ser. No. 08/131,981 filed Oct. 4, 1993 and entitled "Bag Construction For A Dock Leveler"; Ser. No. 08/250,650 filed May 27, 1994 and entitled "Dock Leveler Incorporating An Inflatable Bag"; Ser. No. 08/131,983 filed Oct. 4, 1993 and entitled "Improved Support And Attachment Mechanism For a Dock Leveler Lift Bag; Ser. No. 08/131,988 filed Oct. 4, 1993 and entitled "Support Mechanism For A Dock Leveler Lift Bag"; Ser. No. 08/380,956 filed Jan. 31, 1995 and entitled "Improvements In A Dock Leveler In Which The Ramp Is Raised And Lowered Using An Inflatable Member"; and Ser. No. 08/381,083 filed Jan. 31, 1995 and entitled "Dock Leveler Having A Ramp Movable To A Raised Position By Inflation Of An Inflatable Member With A Filler For Occupying Volume Within The Inflatable Member". The disclosures of these applications are hereby incorporated by reference.

While an airbag-operated lifting assembly is shown and described, it is understood that lip lifting mechanism 42 of the invention could be employed when any other type of mechanism is used to raise ramp 24, such as a hydraulic cylinder-operated lifting mechanism or a spring-and-holddown arrangement.

FIG. 1 illustrates airbag assembly 46 in its fully inflated condition, in which ramp 24 is moved to its uppermost position prior to engagement with the bed 68 of a truck parked adjacent loading dock 16.

Referring to FIGS. 1 and 3, lip lifting mechanism 42 generally includes a latch or push bar 70, a lifting rod 72, a lip lifting lug 74, a pair of links 76, and a pair of hanger brackets 78. Lifting rod 72, lug 74 and links 76 together form a toggle mechanism between lip 34 and hanger brackets 78 for controlling movement of lip 34 between its operative raised position and its inoperative pendant position.

Push bar 70 is pivotably mounted at its rear end via a pin 80 to one of vertical members 22 of dock leveler frame 20. The opposite end of push bar 70 is freely movable between brackets 78.

Lifting rod 72 is pivotably mounted at its forward end to lip lifting lug 74 via a pin 82 using any satisfactory structure, such as a clevis or the like mounted to the forward end of lifting rod 72. Lifting lug 74 is welded to a hinge tube 83, which receives pin or shaft 40 for providing pivoting movement of lug 74 about lip hinge pin 40. Lifting lug 74 defines a forward surface 84 adapted to engage the under-side of lip 34 so that, as lifting lug 74 is pivoted forwardly about hinge pin 40, lug forward surface 84 engages the underside of lip 34 to pivot lip 34 to its extended operative position, as will be explained.

Referring still to FIGS. 1–3, the rear end of lifting rod 72 carries a clevis 86, which is pivotably connected to links 76 through a pin 88, in the form of a shoulder bolt, through bushings 89. A roller 90 (FIG. 3) is journaled on pin 88, between links 76 and between the arms of clevis 86.

The opposite ends of links 76 are pivoted by pivot pins 92 welded to and extending outwardly in opposite directions from brackets 78. Pins 92 extend through bushings 94 mounted within openings formed in links 76, for providing smooth, pivotable mounting of links 76 to brackets 78. Pin 88 defines a first pivot axis about which links 76 are pivotably mounted to the rear end of lifting rod 72, and pins 92 define a second pivot axis about which links 76 are pivotably mounted to brackets 78.

A latch pin 96, also in the form of a shoulder bolt, extends through bushings 97 secured within aligned openings in links 76 and is located between pins 88 and 92. Latch pin 96 is offset from a transverse axis or line extending between the first and second pivot axes defined by pins 88 and 92, respectively.

As shown in FIG. 3, push bar 70 is received between brackets 78 and, in a manner to be explained, is selectively engageable with latch pin 96 and roller 90 for controlling the position of links 76 and lifting rod 72. Push bar 70 includes a stop pin 98 near its upper forward end, which extends outwardly from both sides of push bar 70. Notches 100 are formed in forward surfaces 101 of brackets 78, and are engageable by stop pin 98 as will be explained.

Push bar 70 further includes a latch member 102 welded within a recess 104 formed in the lower surface of push bar 70 toward its upper forward end. The longitudinal axis of latch member 102 is oriented at an angle, preferably approximately 6°, relative to the longitudinal axis of push bar 70. The forward end of latch member 102 is thus oriented at an angle of approximately 84° relative to the longitudinal axis of push bar 70. Push bar 70 further includes a sloped surface 106, disposed between a forward lower edge 108 and a latching edge 110 located adjacent the forward end of latch member 102.

In operation, lip lifting mechanism 42 functions as follows. As ramp 24 is moved to its raised position of FIG. 1 by inflation of airbag assembly 46, latch pin 96 rides along the lower surface of push bar 70 and latch member 102 until latch pin 96 falls into a notch defined by the forward end of latch member 102 in combination with latching edge 110, as shown in FIG. 2. Engagement of stop pin 98 with the forward edges of brackets 78 limits upward movement of ramp 24. With ramp 24 in its upwardly inclined raised position, as shown in FIG. 1, lip 34 is still in its pendant position.

The operator then stops operation of fan 64, and the weight of ramp 24 then begins the descent of ramp 24 from its raised position by deflating airbag assembly 46, during which air is exhausted through an air outlet, e.g. by reverse flow of air through fan 64. Push bar 70 is engaged with links 76 through engagement of latch pin 96 with the forward end of latch member 102 and latching edge 110, so that downward movement of ramp 24 relative to push bar 70 causes links 76 to pivot forwardly in a counterclockwise direction. As shown in FIGS. 4 and 5, this forward counterclockwise pivoting movement of links moves lifting rod 72 forwardly to raise lip 34, until lifting rod 72 and links 76 are an in-line or on-center position. In this position of the toggle mechanism, lip 34 is in an extended position just short of its latched position.

Continued downward movement of ramp 24 moves links 76 and lifting rod 72 beyond the on-center position of FIGS. 4 and 5 to an over-center position as shown in FIG. 6. In the over-center position, the weight of lip 34 acting rearwardly through lifting rod 72 tends to pivot links 76 counterclockwise and results in engagement of latch pin 96 with stop surfaces 112 defined by notches formed in the forwardmost portions of the lower edges of brackets 78. Such engagement of latch pin 96 with stop surfaces 112 fixes the over-center position of the toggle in which brackets 78, links 76 and lifting rod 72 function to maintain lip 34 in its extended position and to latch lip 34 relative to ramp 24.

As links 76 and lifting rod 72 move to the over-center position of FIG. 6, roller 90 engages surface 108 formed on the lower edge of push bar 70, so as to lift push bar 70 upwardly to move the forward end of latch member 102 out of engagement with latch pin 96, as shown in FIG. 6.

Continued downward movement of ramp 24 by deflation of airbag assembly 46 results in engagement of lip 34 with truck bed 68, as shown in FIG. 7, to pivot lip 34 to a fully extended position in which lip 34 is substantially flush with deck plate 26. In practice, lip 34 when fully extended engages the forward edge of deck plate 26, and is approximately 7° from being planar with deck plate 26.

When lip 34 engages truck bed 68, the weight of lip 34 is removed from lifting rod 72. When this occurs, links 76 and lifting rod 72 pivot downwardly to an under-center position as shown in FIG. 7, thereby breaking the toggle and latch and moving forward surface 84 of lug 74 out of engagement with the underside of lip 34. The operator then operates fan 64 to inflate airbag assembly 30, raising ramp 24. As ramp 24 raises, lip 34 is raised at hinge pin 40 connection ramp lug 36. As lip 34 raises, it drags off truck bed 68 and then rotates to its pendant position. The operator then stops operation of fan 64 when lip 34 is fully disengaged from truck bed 68. The weight of ramp 24 deflates airbag assembly 46 to move dock leveler 12 to a storage position, shown in FIG. 10.

Figure 9:
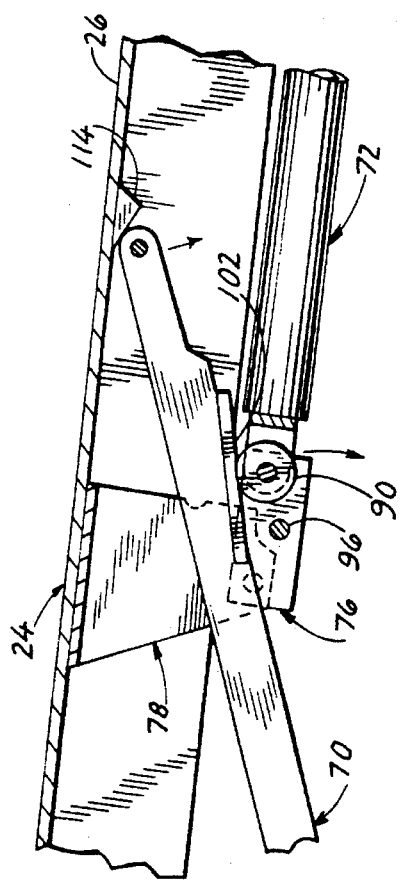
FIG. 9 is an enlarged partial section view similar to FIGS. 2, 5 and 6, showing one of the links and portions of the push bar and lifting rod for the dock leveler when in its FIG. 8 position.

FIGS. 8 and 9 illustrate a situation in which lip 34 does not engage the bed of a truck as ramp 24 moves downwardly toward its fully lowered position. In this case, the toggle defined by links 76 and lifting rod 72 is maintained in its over-center latched position in which lip 34 is in its extended position, as shown in FIG. 8.

Figure 11:
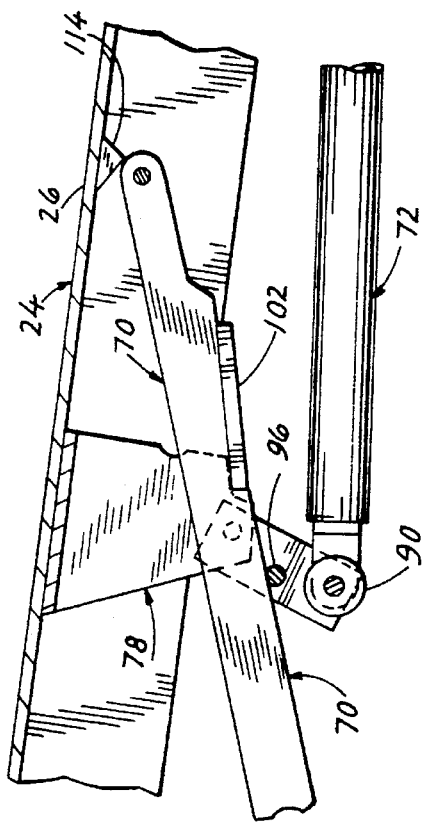
FIG. 11 is a partial sectional view similar to FIGS. 2, 5, 6 and 9, showing one of the links and portions of the push bar and lifting rod when the ramp is in its FIG. 10 position.
Figure 10:
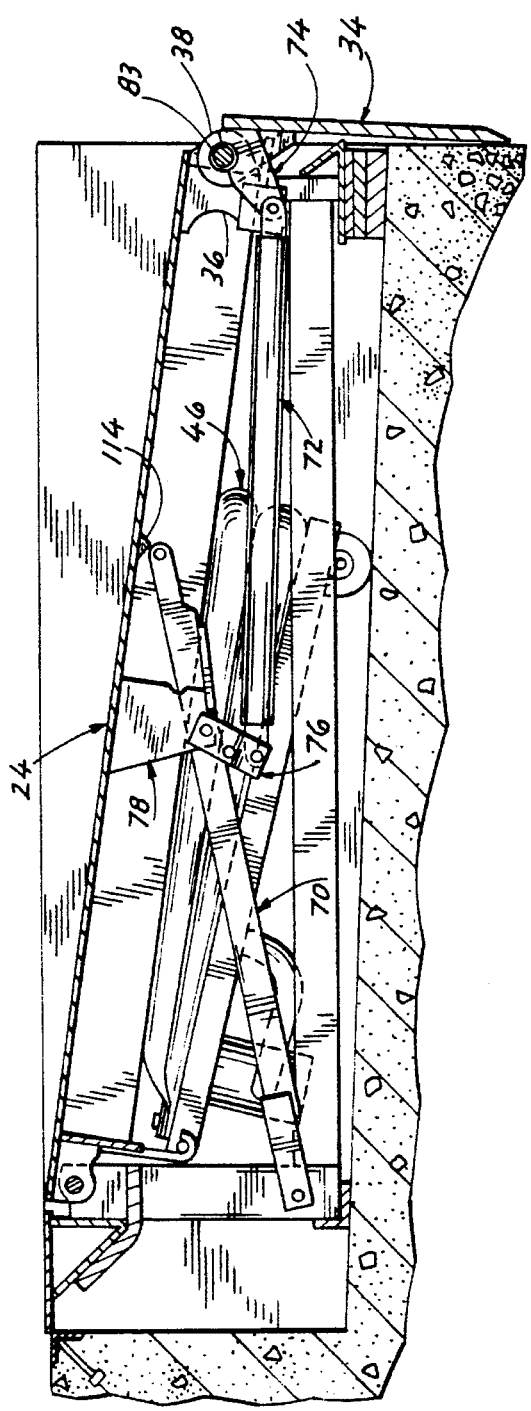
FIG. 10 is a view similar to FIGS. 1, 4, 7 and 8, showing the ramp in its full-down position with the lip returned to its inoperative pendant position.

A trip member 114 is mounted to the underside of deck plate 26. Trip member 114 is in the form of an angle section mounted so as to be in line with push bar 70. With this arrangement, as ramp 24 approaches its full-down position with lip 34 extended, the end of push bar 70 engages the angled rear surface of trip member 114 to pivot push bar 70 in a clockwise direction about mounting pin 80 and to engage the lower surface of latch member 102 with roller 90. This results in clockwise pivoting movement of links 76 about pins 92, to move links 76 and lifting rod 72 away from their over-center latched position and back to their under-center release position as shown in FIGS. 10 and 11, in which the toggle is broken. This results in lifting lug 74 moving to its release position of FIG. 7, enabling lip 34 to fall back to its pendant position as shown in FIG. 10, in preparation for a subsequent cycle.

In normal operation, push bar 70 is in its position as shown in FIG. 1 when ramp 24 is raised. In an unusual situation, links 76 and lifting rod 72 may already be in their over-center position of FIG. 6 when ramp 24 is raised. In a situation such as this, stop pin 98 is received within notches 100 to limit upward movement of ramp 24. The forward upper end of push bar 70 then rides on roller 90 as ramp 24 is lowered, as described above.

The lip lifting mechanism of the present invention provides advantageous operation and prolonged life over prior art lip lifting mechanisms. The use of bushings 89, 94 and 97 to pivotably mount pins 88, 92 and 96 to links 76 substantially increases the cycle life of the links 76 and the pins. The offset of latch pin 96 from pins 88 and 92, along with the angle of the forward end of latch member 102 and its distance from the centerline of push bar 70, provides a greater rotating force exerted on links 76 than in prior art constructions. Further, trip member 114 provides a positive mechanism for ensuring that, at the end of each cycle, lip 34 is returned to its pendant position. All of these features combine to yield a lip lifting mechanism which provides advantages in construction and operation over prior art lip lifting mechanisms.

Various alternatives and embodiments are contemplated as being within the scope of the following claims particularly pointing out and distinctly claiming the subject matter regarded as the invention.

I claim:

1. A lip lifting mechanism for a dock leveler having a ramp pivotably mounted for movement between a raised position and a lowered position, a lip pivotably mounted to the ramp for movement between an inoperative position and an extended operative position in which the lip forms an extension of a deck plate forming a part of the ramp, and a selectively operable lifting mechanism for raising the ramp to its raised position from its lowered position for subsequent lowering of the ramp, comprising:

a push bar defining first and second ends, wherein the push bar is pivotably mounted toward its first end to a stationary structure;

an axial lifting rod defining first and second ends, wherein the first end of the lifting rod is pivotably mounted to a pivotable lug with which the lip is engageable;

a link pivotably mounted to the lifting rod toward its first end for pivoting movement about a first pivot axis, and pivotably mounted to the ramp for pivoting movement about a second pivot axis, and wherein the second end of the push bar is located adjacent the link and is movable relative to the link upon movement of the link caused by raising and lowering of the ramp; and engagement structure between the link and the push bar for engaging the push bar with the link upon lowering of the ramp from its raised position toward its lowered position, wherein the engagement structure functions to move the link and the lifting rod into an over-center toggle position upon movement of the ramp toward its lowered position for moving the lip from its inoperative position and for maintaining the lip in its extended operative position, and wherein the engagement structure between the link and the push bar is engageable at a location spaced from a transverse axis interconnecting the first and second pivot axes of the link.

2. The lip lifting mechanism of claim 1, wherein the link is pivotably mounted to the ramp via a bracket member mounted to and depending downwardly below the ramp.

3. The lip lifting mechanism of claim 2, wherein the bracket member defines a pair of side edges and a downwardly facing lower edge, and wherein the engagement structure between the link and the push bar includes a pin member extending outwardly from the link, wherein the pin member is engageable with the bracket lower edge to limit pivoting movement of the link and for fixing the link and the lifting rod in the over-center toggle position.

4. The lip lifting mechanism of claim 3, wherein the lower edge of the bracket member defines a notch within which the pin member is received when the link and the lifting rod are in the over-center toggle position.

5. The lip lifting mechanism of claim 2, wherein the bracket member defines a pair of side edges and a downwardly facing lower edge, and further comprising a stop member mounted to the push bar toward its second end for engaging a side edge of the bracket member to limit upward movement of the ramp to its raised position.

6. The lip lifting mechanism of claim 5, further comprising a notch formed in the side edge of the bracket member engageable by the push bar stop member for receiving the stop member to interlock the push bar and the bracket member.

7. The lip lifting mechanism of claim 1, wherein the engagement structure comprises a pin member extending outwardly from the link and located below the transverse axis when the link and the lifting rod are in the over-center toggle position.

8. The lip lifting mechanism of claim 1, further comprising a trip member fixed to the ramp and movable therewith, the trip member being engageable by the push bar toward its second end when the ramp reaches a predetermined position during movement of the ramp toward its lowered position from its raised position, to cause engagement of the push bar with the link to move the link and the lifting rod away from the over-center toggle position, to break the toggle and enable the lip to fall to its inoperative position from its extended operative position.

9. The lip lifting mechanism of claim 8, wherein the trip member comprises a depending protrusion on the underside of the deck plate.

10. In a dock leveler having a ramp pivotably mounted for movement between a raised position and a lowered position; a lip pivotably mounted to the ramp for movement between an inoperative position and an extended operative position in which the lip forms an extension of a deck plate forming a part of the ramp; a selectively operable lifting mechanism for raising the ramp to its raised position from its lowered position for subsequent lowering of the ramp; and a toggle mechanism for moving the lip to its extended operative position upon movement of the ramp toward its lowered position from its raised position, the toggle mechanism comprising an axial lifting rod engageable with the lip via a lug structure pivotably connected to the ramp adjacent the lip, a push bar defining first and second ends and being pivotably mounted to stationary structure toward its first end, a link pivotably mounted to the ramp for movement about a first pivot axis and pivotably mounted to the lifting rod for movement about a second pivot axis, and releasable engagement structure interposed between the link and the push bar toward the second end of the push bar for engaging the push bar with the lifting rod through the link when the link is in a lip lifting position in which the link and the lifting rod form a rigid toggle structure for moving the lip to its extended operative position upon lowering of the ramp; the improvement comprising a release arrangement for moving the link away from its lip lifting position to break the rigid toggle structure, comprising a trip member fixed to the ramp and movable therewith, the trip member being engageable with the push bar toward its second end when the ramp reaches a predetermined position during movement of the ramp toward its lowered position from its raised position, to cause engagement of the push bar with the link to move the link away from its lip lifting position, to break the toggle and to enable the lip to fall to its inoperative position from its extended operative position.

11. The improvement of claim 10, wherein the link is pivotably mounted to the ramp via a bracket member mounted to and depending downwardly below the ramp.

12. The improvement of claim 11, wherein the bracket member defines a pair of side edges and a downwardly facing lower edge, and wherein the releasable engagement structure interposed between the link and the push bar includes a pin member extending outwardly from the link, wherein the pin member is engageable with the bracket lower edge to limit pivoting movement of the link and for fixing the link in its lip latching position, in which the link and the lifting rod are in an over-center toggle position to maintain the lip in its extended operative position.

13. The improvement of claim 11, wherein the bracket member defines a pair of side edges and a downwardly facing lower edge, and further comprising a stop member mounted to the push bar toward its second end for engaging a side edge of the bracket member to limit upward movement of the ramp to its raised position.

14. The improvement of claim 10, further comprising a roller mounted to the link for rotating movement about an axis coincident with the second pivot axis, and wherein engagement of the push bar second end with the trip member engages the push bar with the roller to pivot the link about the first pivot axis to move the link and the lifting rod away from the over-center toggle position.

15. The improvement of claim 10, wherein the trip member comprises a downwardly extending protrusion mounted to and extending downwardly from a bottom surface defined by the deck plate.

16. The improvement of claim 10, wherein the releasable engagement structure interposed between the link and the push bar is engageable at a location spaced from a transverse axis interconnecting the first and second pivot axes of the link.

17. A lip lifting mechanism for a dock leveler having a ramp pivotably mounted for movement between a raised position and a lowered position, a lip pivotably mounted to the ramp for movement between an inoperative position and an extended operative position in which the lip forms an extension of a deck plate forming a part of the ramp, and a selectively operable lifting mechanism for raising the ramp to its raised position from its lowered position for subsequent lowering of the ramp, comprising:

a push bar defining first and second ends, wherein the push bar is pivotably mounted toward its first end to a stationary structure;

an axial lifting rod defining first and second ends, wherein the first end of the rod is pivotably mounted to a pivotable lug with which the lip is engageable;

a link pivotably mounted to the lifting rod toward its second end for pivoting movement about a first pivot axis, and pivotably mounted to the ramp for pivoting movement about a second pivot axis, and wherein the second end of the push bar is located adjacent the link and movable relative to the link upon movement of the link caused by raising and lowering of the ramp;

engagement structure between the link and the push bar for engaging the push bar with the link upon lowering of the ramp from its raised position toward its lowered position, wherein the engagement structure functions to move the link and the lifting rod into an over-center toggle position upon movement of the ramp toward its lowered position for moving the lip from its inoperative position and for maintaining the lip in its extended operative position, wherein the engagement structure between the link and the push bar is engageable at a location spaced from and out of alignment with a transverse axis interconnecting the first and second pivot axes of the link; and a release arrangement for moving the link from its lip lifting position to move the link and the lifting rod away from the over-center toggle position, comprising a trip member fixed to the ramp and movable therewith, the trip member being engageable with the push bar toward its second end when the ramp reaches a predetermined position during movement of the ramp toward its lowered position from its raised position, to cause engagement of the push bar with the link to move the link and the lifting rod away from the over-center toggle position and to enable the lip to fall to its inoperative position from its extended position.

* * * * *